UNITED STATES PATENT OFFICE.

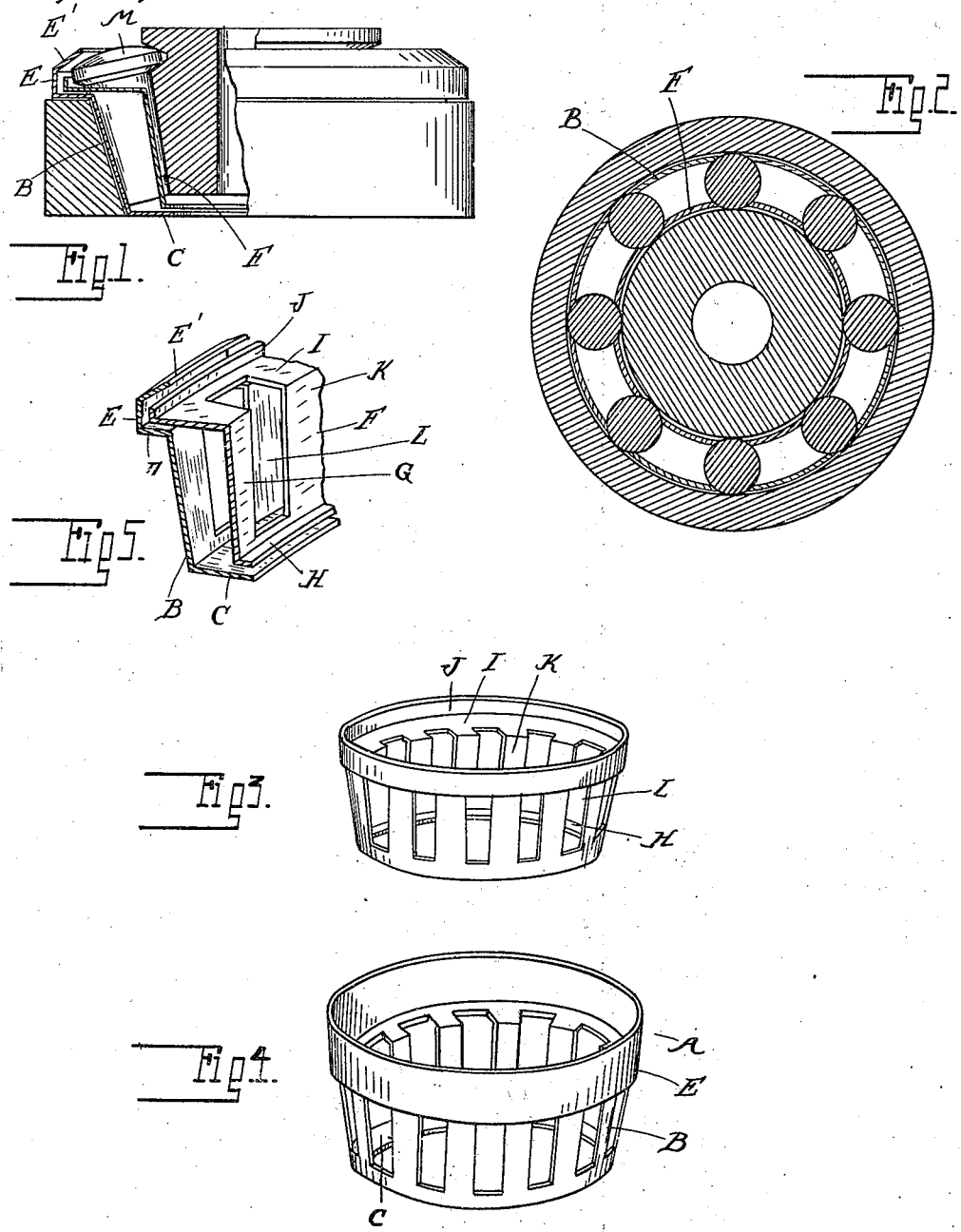

ARTHUR J. STRONG, OF TOLEDO, OHIO, ASSIGNOR, BY MESNE ASSIGNMENTS, TO THE BOCK BEARING COMPANY, OF TOLEDO, OHIO, A CORPORATION OF OHIO, (INCORPORATED IN MARCH, 1916.)

CAGE FOR ROLLER-BEARINGS.

1,242,388.  Specification of Letters Patent.  Patented Oct. 9, 1917.

Application filed August 31, 1914. Serial No. 859,385.

*To all whom it may concern:*

Be it known that I, ARTHUR J. STRONG, a citizen of the United States of America, residing at Toledo, in the county of Lucas and State of Ohio, have invented certain new and useful Improvements in Cages for Roller-Bearings, of which the following is a specification, reference being had therein to the accompanying drawings.

The invention relates to cages for roller bearings, and has for its object the obtaining of a construction in which the rolls are held in proper alinement and are retained from endwise displacement. More particularly, the invention is applicable to that type of roller bearings in which conical rolls having enlarged heads for receiving end thrust are used.

In the drawing:

Figure 1 is a central section through a bearing provided with my improved cage;

Fig. 2 is a section in the plane of rotation;

Figs. 3 and 4 are perspective views respectively of the inner and outer annular sheet metal stamping forming the cage, and Fig. 5 is a detailed cross section of the assembled cage.

A is a sheet metal stamping provided with a conical portion B having an inwardly-turned flange C at its lower end, an outwardly-turned flange D at its upper end and a cylindrical flange E. F is a similar stamping having the conical portion G, the flanges H I and J corresponding respectively to the flanges C D and E. The proportion of the parts is, however, such that when the two stampings are nested the conical portions B and G will lie parallel but spaced from each other, while the portions H C and I D lie in contact with each other. Both of the conical portions B and G are apertured to form roll-receiving pockets. The width of these apertures is such that when the rolls are in place, as shown in Fig. 2, they will be held in the space between the portions B and G and alined by the edges of the spoke portions K between apertures.

To assemble the rolls in the cage, they are dropped into the pockets formed by the apertures L, which extend into the flange I of the member F, as well as the conical portion G thereof, the head M of the roll being above the flange I and within the flanges J and E. The flange E is then bent inward over the heads of the rolls and the flange J, this operation being performed either by spinning or by suitable dies. When complete the inwardly-bent flange E' will both retain the rolls from endwise movement and also retains the member F in locked relation to the member A by embracing the flange J.

The construction of cage as above described is one in which the rolls are accurately alined, as each roll is in contact with the edges of the spoke portions K at four equally distributed points in its circumference. Furthermore, the parallel conical portions of the two stampings, together with the laterally-extending flanges thereof, form a strongly braced construction which cannot be easily distorted.

What I claim as my invention is:—

1. A cage for roller bearings, comprising a pair of concentric spaced annular members having laterally-extending overlapping flanges extending in the same direction, said members being cut away to form pockets for receiving rolls.

2. A cage for roller bearings, comprising a pair of concentric spaced annular members having laterally-extending flanges extending between the same, said members being cut away to form pockets for receiving the rolls, and one of said members having a flange turned over the end of the rolls to form a retainer therefor.

3. A cage for roller bearings, comprising a pair of concentric conical annular members, provided with laterally-extending flanges extending between the same, said members being cut away to form pockets for receiving conical rolls.

4. A cage for roller bearings, comprising concentric spaced annular members cut away to form pockets for receiving the rolls, said members having laterally projecting flanges extending between the same, and the outer member having a flange turned over the flange on the inner member to retain the same and to form an end retainer for the rolls.

5. A cage for roller bearings, comprising a pair of sheet metal stampings provided with concentric spaced conical portions cut away to form pockets for receiving the rolls therebetween, and with laterally-extending flanges at opposite ends of said conical portions overlapping each other, one of said stampings having an outwardly-extending flange at the large end of the cage turned over the end of the roll to form a retainer therefor.

6. In roller bearings, a sheet metal stamping having a conical portion apertured to form spokes, rolls partially within the apertures and lying against the edges of the spokes, means for laterally maintaining said rolls in position, said stampings having laterally-extending flanges at opposite ends of said conical portion and an outwardly-extending flange at one end of said conical portion, turned over the end of the roll to form a vertical retainer therefor.

7. A cage for roller bearings, comprising a pair of spaced annular members, one of said members being insertible into nested relation with the other of said members, both of said members being oppositely cut away to form a series of pairs of spokes, and rolls intermediate said pairs of spokes.

8. A cage for roller bearings, comprising inner and outer concentric spaced annular members having cut-away portions, and rollers engaging said cut-away portions, being of greater diameter than the width of the openings and the space between said members, said rollers adapted to engage said cut-away portions and project through one end thereof when said inner and outer annular members are substantially in position.

9. A bearing cage comprising a pair of spaced annular members in nested relation and having cut-away portions engageable with rolls, and a bendable flange upon one of said members for retaining both in substantially fixed relation.

In testimony whereof I affix my signature in presence of two witnesses.

ARTHUR J. STRONG.

Witnesses:
 CHAS. P. CROSBY,
 JAS. R. COLE.